(12) United States Patent
Becker et al.

(10) Patent No.: US 12,346,345 B2
(45) Date of Patent: Jul. 1, 2025

(54) AUTOMATED CONSISTENT IMPLEMENTATION OF FORMULA FIELDS

(71) Applicant: Clari Inc., Sunnyvale, CA (US)

(72) Inventors: Brian Becker, Sunnyvale, CA (US); Christopher Songer, Sunnyvale, CA (US); Simon Zhang, Sunnyvale, CA (US)

(73) Assignee: CLARI INC., Sunnyvale, CA (US)

( * ) Notice: Subject to any disclaimer, the term of this patent is extended or adjusted under 35 U.S.C. 154(b) by 83 days.

(21) Appl. No.: 18/301,071

(22) Filed: Apr. 14, 2023

(65) Prior Publication Data

US 2024/0346046 A1 Oct. 17, 2024

(51) Int. Cl.
*G06F 16/20* (2019.01)
*G06F 16/21* (2019.01)
*G06F 16/25* (2019.01)
*G06F 16/28* (2019.01)

(52) U.S. Cl.
CPC .......... *G06F 16/283* (2019.01); *G06F 16/213* (2019.01); *G06F 16/258* (2019.01)

(58) Field of Classification Search
None
See application file for complete search history.

(56) References Cited

U.S. PATENT DOCUMENTS

| | | | |
|---|---|---|---|
| 6,873,981 B2* | 3/2005 | Nareddy | G06Q 30/02 707/769 |
| 11,269,824 B1* | 3/2022 | Waas | G06F 16/2448 |
| 2022/0019597 A1* | 1/2022 | Takagi | G06F 16/25 |
| 2022/0245091 A1* | 8/2022 | Batsakis | G06F 16/958 |
| 2022/0309045 A1* | 9/2022 | Lambert | G06F 16/219 |
| 2023/0089667 A1* | 3/2023 | Li | G06F 16/2458 707/609 |

* cited by examiner

*Primary Examiner* — Jau Shya Meng
(74) *Attorney, Agent, or Firm* — WOMBLE BOND DICKINSON (US) LLP (57) ABSTRACT

A processing device may obtain, from a remote data source, a first database formula having a first syntax. The processing device may translate the first database formula to a normalized database formula having a normalized syntax and obtain, from the remote data source, data that is associated with the first database formula. The processing device may update a target database, based on the obtained data and the normalized database formula.

18 Claims, 6 Drawing Sheets

AUTOMATED CONSISTENT IMPLEMENTATION OF FORMULA FIELDS

TECHNICAL FIELD

Embodiments of the present disclosure relate generally to a data processing system and more particularly, embodiments of the disclosure relate to automated, consistent implementation of formula fields from one or more data platforms.

BACKGROUND

With a data platform tool, a user may view data in a flexible manner to gain insight. Breaking down data by different attributes or expressing relationships between data may help a user analyze large amounts of data, uncover resource allocation needs, compare opportunities by categories, and improve forecasting accuracy. A data platform tool may manage one or more databases and provide access to various fields in the database. Visually showing the data and drilling down into specific areas may help a user to build reports and understand the state of data groupings, or relationships between data.

A field of a database may include a formula that expresses a relationship between the field and other fields, constant values, operations, runtime data, or a combination thereof. A data platform tool may access and pool information from one or more external data platform tools. Different platform tools may use different formats for how they express a given formula. Issues may arise.

BRIEF DESCRIPTION OF THE DRAWINGS

Embodiments of the disclosure are illustrated by way of example and not limited to the figures of the accompanying drawings in which like references indicate similar elements.

DETAILED DESCRIPTION

A local data platform tool may support formulas that have two distinct sources: one set of formulas may be originated locally in the data platform tool's own data warehouse, and a second set of formulas may be synchronized from one or more remote data sources (e.g., Salesforce and/or another remote data source). Each remote data source may manage one or more remote source databases. Formulas in the remote source database may determine the relevant data and/or schema modification events in the local data platform tool. Such formulas may be tracked. Tracking these formulas in a remote data source may be improved upon through maintenance of significantly more complicated formula frameworks than are typically found in modern databases. Further, different data sources may have different formula syntax. Traditional data platform tools may be improved upon to address issues described.

Embodiments of the present disclosure may support formula evaluation for formulas that originate in one or more different remote data sources, bringing the formulas into a unified formula format in a target data platform tool. The target data platform tool (e.g., a target data warehouse system) may aggregate data from each of the different remote data sources. The aggregated data may be organized via a schema (e.g., using star schema, fact tables, and dimension tables). In some examples, the remote data sources may be referred to as remote customer relationship management (CRM) systems. The target data platform tool may be referred to as the local data platform.

The local data platform may translate a formula from a remote data source into a formula having a normalized or unified formula syntax. For example, each data source may have a distinct formula language that may express the same element in a different way. At the local data platform, the unified formula may be populated to one or more fact tables and dimension tables so that the unified formula can be evaluated against an aggregated data set (e.g., a target database) managed by the local data platform. In some embodiments, the local data platform may determine if the formula is mutable or immutable. The local data platform may determine each and every dependency of the formula, obtain those dependencies, and update the aggregated data set according to the obtained dependencies. In some embodiments, fields from different remote databases may be aggregated and evaluated with respect to each other in a common aggregated data set. In some examples, new fields may be created in the aggregated data set if it is determined that the new field should be generated for proper evaluation or performance of the formula. Operations described may preserve accuracy of formula evaluation across remote data sources (e.g., data warehouses) and retain accuracy with formula and schema modification.

In some examples, aspects described may account for different types of formulas such as immutable formulas which may include one or more dependencies on values in table cells, and mutable formulas which may include one or more dependencies on the state outside of the database (e.g., timestamp( ) or other time varying states). Correct evaluation of inter-data warehouse dependencies may benefit from a higher-level contract (implemented by the local data platform) that defines a set of tables that may be updated during runtime to provide closure of the set of tables with respect to the formulas. The set of tables (e.g., fact tables and/or dimension tables) may be tracked and maintained to maintain closure property over some types of schema changes and formula re-definition. Maintaining or verifying closure may include verifying that all data dependencies are accounted for in the target schema (e.g., the schema governing the aggregated data in the local data platform). The data dependencies may be gleaned from one or more formulas that are obtained from a remote system and then normalized in the target system, as described in the present disclosure. In some embodiments, the target schema may be modified so that each normalized formula has its dependencies encapsulated into a single fact table, regardless of the schema of the dimension tables, thereby reducing complexity of the formula representation and evaluation at time of query.

In one aspect, a method, performed by a computing device, includes obtaining, from a remote data source (e.g., a customer relationship management (CRM) system), a first database formula having a first syntax, translating the first database formula to a normalized database formula having a normalized syntax, obtaining, from the remote data source, data that is associated with the first database formula, and updating a target database, based on the obtained data and the normalized database formula. The method may also include displaying a result of the normalized database formula to a user, where the first database formula is selected in response to a user input from the user, and indicating one or more fields of interest that are associated with the first database formula of the remote data source.

The method may also include obtaining, from a second remote data source, a second database formula having a second syntax that is different from the first syntax, translating the second database formula to a second normalized database formula having said normalized syntax, obtaining, from the second remote data source, second data that is associated with the second database formula, and updating said target database or a second target database, based on the obtained second data and the second normalized database formula.

In some examples, obtaining the data from the remote data source may include using an application programming interface (API) to retrieve metadata associated with a database field of the remote data source, extracting the first database formula from the metadata, and in response to the first database formula having one or more dependencies, recursively obtaining one or more additional database fields or one or more additional database formulas that the first database formula depends on. Similarly, updating the target database may include updating a schema that is associated with the target database to include one or more fields or one or more formulas based on the normalized database formula. Similarly, in response to the first database formula being immutable, the method may compute the normalized database formula based on the updated target database. In response to the first database formula being mutable, the method may compute the normalized database formula based on a runtime operation.

In some examples, the method may verify that a result of the normalized database formula matches a second result of the first database formula. Each of a plurality of normalized database formulas may be encapsulated into a single fact table (e.g., on a one-to-one basis). Translating the first database formula to a normalized database formula having a normalized syntax and evaluation of the first database formula may be performed at runtime.

In some examples, the method may also include generating a normalized third formula that refers to the obtained data from the remote data source, and the obtained data from the second remote data source that are in the target database, and displaying a result of the normalized third formula to a user. Other technical features may be readily apparent to one skilled in the art from the following figures, descriptions, and claims.

Figure 1:
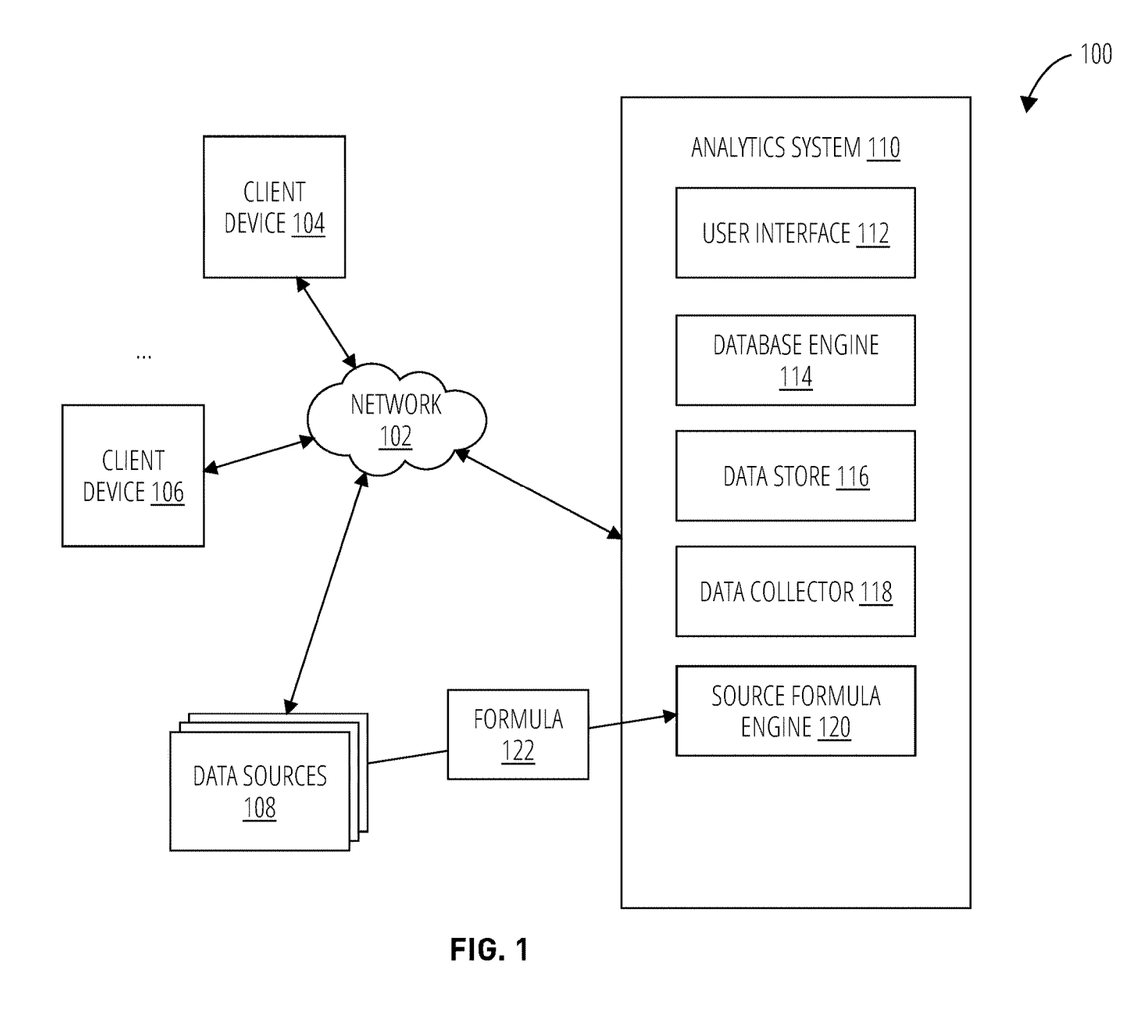
FIG. 1 shows a block diagram illustrating a SaaS system in a production environment according to one embodiment of the disclosure.

FIG. 1 shows a block diagram illustrating a SaaS system in a production environment according to one embodiment of the disclosure. Referring to FIG. 1, system 100 includes, but is not limited to, one or more client systems (e.g., 104, 106) communicatively coupled to analytics system 110 over network 102. Clients 104, 106, may be any type of clients such as a host or server, a personal computer (e.g., desktops, laptops, and tablets), a "thin" client, a personal digital assistant (PDA), a Web enabled appliance, or a mobile phone (e.g., Smartphone), etc. Network 102 may be any type of computer network such as a local area network (LAN), a wide area network (WAN) such as the Internet, or a combination thereof, wired or wireless. Analytics system 110 can be any kind of server or a cluster of servers, such as, for example, web servers, application servers, cloud servers, backend servers, etc.

In one embodiment, analytics system 110, which may be a cloud server, provides data analytics services to clients 104, 106, based on data that is obtained from one or more data sources 108. Each data source 108 may manage one or more respective databases and make data from the databases available. In some examples, data analytics system 110 may be implemented as a multi-tenancy system that can access multiple data sources 108 concurrently. For example, a user of client device 104 may be associated with a first entity or organization as a first corporate client to data analytics system 110, while a user of client device 106 may be associated with a second entity or organization as a second corporate client to data analytics system 110. The first and second entities may wish to use different database systems, each of which maintains a database or data structure storing data for the entities.

In one embodiment, data analytics system 110 includes, but is not limited to, user interface 112, database engine 114 (also referred to as database manager, which may be part of database management software), data store 116, data collector 118, and source formula engine 120. User interface 112 can be any kind of user interface (e.g., Web, graphical user interface or GUI, or command line interface or CLI) that allows users of client devices 104, 106, to access data analytics services provided by data analytics system 110, such as, for example, forecasts, trend analysis, or pulse analysis services to be performed for various time periods for some underlying data. The underlying data can include tasks, projects, products, or any type of customer relations data. For example, via user interface 112, a user can request a trend snapshot/analysis for a set of tasks of a specific time period by specifying one or more attributes (database fields) associated with the tasks. Each of the tasks can be associated with an entity (company or project or database table). Attributes can represent columns of a database table. Each entity can include numerous objects/records with at least attributes corresponding to an identifier attribute (to identify the object/record) and a modification date attribute (a time when the object/record is modified).

In response to a request received via user interface 112 from a client, such as clients 104, 106, database engine 114 determines a period of time (e.g., a query time period) based on the request that the user is interested in. The query time period can be a current quarter, week, day, or year. Database engine 114 further determines a set of one or more attributes, which may be received from a user via user interface 112. Database engine 114 retrieves task data associated with the time period and the one or more attributes from data store 116.

Data store 116 stores or caches a variety of time-series data, such as projects, tasks, and product facts. Time-series data are data collected at different points in time. Data collector 118 can be configured to periodically collect or update data from data sources 108 to store in data store 116. For example, data collector 118 can be periodically updated from corresponding data source(s) or data provider(s) 108, for example, via a periodically executed thread (which may be running as a subroutine or as a background job as a part of a housekeeping routine or thread) over a network (e.g., Internet). Alternatively, database engine 114 may dynamically access a task database system to query and retrieve task data using a variety of database accessing protocols associated with the task database system, such as an SQL protocol. Data stored in data store 116 can be maintained in a variety of data structures, such as one or more tables contained within one or more databases. Database engine 114 can access data store 116 via a variety of application programming interfaces (APIs), database queries, or other suitable communication protocols.

In one embodiment, a client device (e.g., 104, 106) may send a request to the data analytics system 110 for a data field that is present in data source 108. A source formula engine 120 may access metadata of the relevant data field in the data source 108 and determine that the data field (e.g., 'total_quantity_of_goods') is associated with a formula 122. Source formula engine 120 may obtain the formula 122 from the remote data source 108, and translate the formula 122 as a normalized formula having a standardized syntax or format within the analytics system 110. Source formula engine 120 may analyze the formula 122 (or a normalized version thereof) to determine one or more dependencies of the formula. Source formula engine 120 may update database engine 114 if additional data fields are needed to properly evaluate the formula 122, thereby updating the schema of data store 116 to support the data that is requested by the client device.

In some embodiments, although shown as integral, analytics system 110 may include a plurality of servers, and the internal components may be distributed throughout the servers. For example, database engine 114 and data collector 118 may maintain data store 116 in a dedicated data server that is a separate server from analytics system 110. Other combinations of the components may be present in various servers of the analytics system 110.

Figure 2:
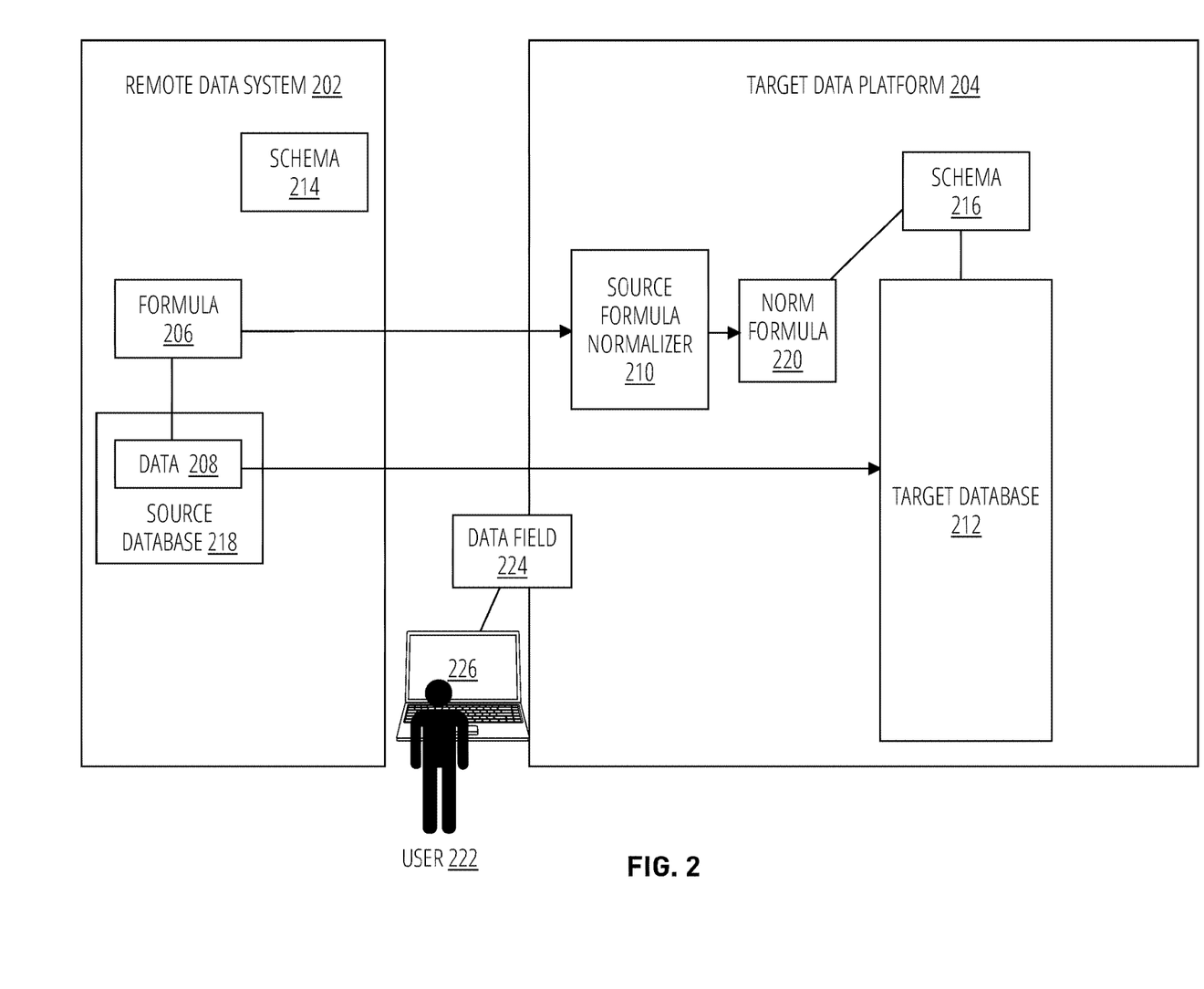
FIG. 2 shows an example of a data platform with formula processing, in accordance with one embodiment.

FIG. 2 shows an example of a data platform with formula processing, in accordance with one embodiment. Target data platform 204 may correspond to an analytics system such as analytics system 110 as described in FIG. 1. Target data platform 204 may also be understood as a local data platform.

Remote data system 202 may correspond to a remote data source such as data source 108 as described in FIG. 1. In some embodiments, remote data system 202 may be a remote customer relationship management (CRM) system. In some examples, target data platform 204 may be coupled to multiple such remote data systems, as described in other examples.

A user 222 may operate a client device 226 that may correspond to a client device such as 104, 106, as described in FIG. 1 to interface with target data platform 204. For example, a user 222 may operate client device 226 to access a user interface of target data platform 204. Through the user interface, user 222 may indicate interest in a data field 224 such as, for example, 'Amount'.

Target data platform 204 may analyze this data field 224 to determine where to source the data in order to present the user with the relevant information (e.g., 'Amount'). For example, target data platform 204 may use an API to crawl schema 214 and/or metadata of databases in remote data system 202 and determine that data field 224 (e.g., 'Amount') is a formula field in source database 218.

Target data platform 204 may obtain from remote data system 202, a first database formula 206. This first database formula 206 may be the formula that is associated with the requested data field 224. For example, formula 206 may include one or more components that may be evaluated to provide the result of 'Amount'. The first database formula 206 may have a first syntax, such as one that is native to remote data system 202. This first syntax may define the symbols or combination of symbols used to express each expression in formula 206. An expression may be a reference to another field, an operation (e.g., adding, subtracting, multiplication, an algorithm, the maximum of, the minimum of, etc.), or reference to a real-time time-varying measured or sensed value (e.g., the current time, the current temperature, a measured pressure, or other measured or sensed value that may change over time).

Figure 4:
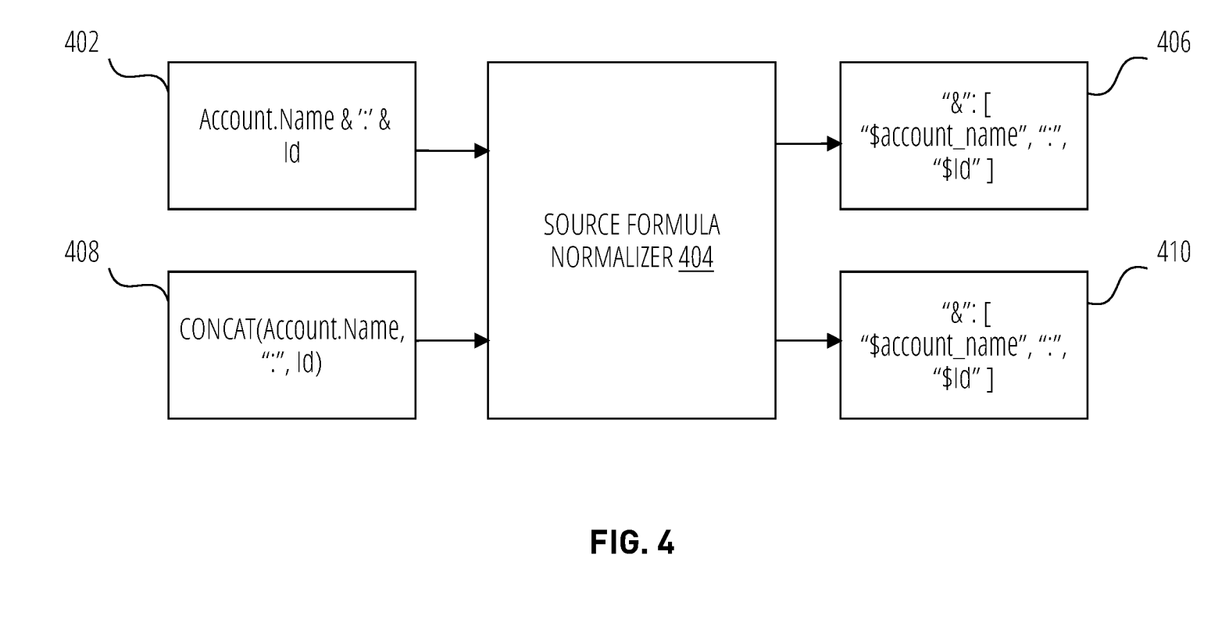
FIG. 4 shows an example of a source formula normalizer, in accordance with one embodiment.

At source formula normalizer 210, target data platform 204 may translate the first database formula 206 to a normalized database formula 220 having a normalized syntax. The normalized syntax may be a syntax that is native to target data platform 204 and different from the first syntax of formula 206. Each syntax may define unique symbols or combination of symbols to reference fields, or define operations or mathematical expressions. FIG. 4 shows an example of formula normalization.

Target data platform 204 may analyze the formula 206 or normalized formula 220 to determine that data 208 that is associated with the first database formula 206. For example, formula 206 may define that 'Amount' depends on a first field 'A' in source database 218, multiplied with a second field 'B' in source database 218. Formula 206 may obtain the data 208 from remote data system 202.

Target data platform 204 may update a target database 212, based on the obtained data 208 and the normalized formula 220. For example, target data platform 204 may update schema 216 to account for the normalized formula 220, new data fields (e.g., field 'A', field 'B', and 'Amount') in target database 212 resulting from normalized formula 220. These fields may include one or more additional formula fields, or non-formula data fields, or both.

Schema 216 may be logical representation or description of the entire target database 212. Schema 216 may include the name and description of records of all record types including all associated data-items and aggregates. Target database 212 may be referred to as a data warehouse. Schema 216 may include a star schema that describes target database 212. Schema 216 may include one or more dimension tables and one or more fact tables. A dimension table stores attributes, or dimensions, that describe objects in a fact table. A dimension may be understood as a collection of reference information about a measurable event. These events may be referred to as facts. The facts may be stored in a fact table. Dimensions categorize and describe data warehouse facts and measures to provide meaningful relationships between the data, which may be specific to the data. Additionally, or alternatively, dimensions may categorize and describe detailed information about aspects of an event, whereas a fact captures measures of the event and references to dimensions related to the event. Target data platform 204 may organize descriptive attributes as columns in dimension tables.

For example, a customer dimension's attributes could include first and last name, birth date, gender, or other attribute. Similarly, a website dimension might include site name and URL attributes. A dimension table may include a primary key column that uniquely identifies each dimension record (row). The dimension table may be associated with a fact table using this key. Data in the fact table can be filtered and grouped by attribute or combination of attribute. For example, a Login fact with Customer, Website, and Date dimensions can be queried for "number of users aged 20 who logged in to website.com at least once during the since X date."

Dimension tables may be referenced by fact tables using keys. When creating a dimension table in a data warehouse, a system-generated key may be used to uniquely identify a row in the dimension. This key, which functions as the primary key in the dimension table, may be referred to as a surrogate key. The surrogate key may be placed in the fact table and a foreign key may be defined between the two tables. Fact and dimension tables are typically de-normalized (e.g., carrying redundant data) to provide an architecture that enables users to analyze data of interest as easily as possible, rather than to manage transactions between systems.

In some examples, if it is determined that formula 206 does not depend on additional data, then no additional data is obtained from remote data system 202. For example, analysis of formula 206 or normalized formula 220 may indicate that dependent data is already present in the target database 212, or that formula 206 or normalized formula 220 is mutable and does not reference other fields. In such a case, target data platform 204 may not obtain data from remote data system 202, at least not because of the user request related to data field 224.

Target data platform may display a result of the normalized database formula 220 to the user 222. For example, the user 222 may request information such as 'Amount'. The first database formula 206 is selected in response to a user input from the user, indicating one or more fields of interest (e.g., 'Amount') that are associated with the first database formula 206 of the remote CRM system. The target database 212 is updated with data 208 that 'Amount' depends upon. Target database platform 204 may evaluate the normalized formula 220 (e.g., 'Amount') with the obtained data 208 in the target database 212 and present the result of the formula 220 to the user (e.g., 'Amount=X'). The display may be on a browser or a dedicated application on client device 226.

In some embodiments, obtaining the data from the remote CRM system comprises using an application programming interface (API) to access or retrieve metadata associated with a database field of the remote CRM system, extracting the first database formula from the metadata, and in response to the first database formula having one or more dependencies, recursively obtaining one or more additional database fields or one or more additional database formulas that the first database formula depends on.

For example, assuming that data field 224 indicates 'Amount'. Target data platform 204 may use an API to access and crawl metadata associated with an 'Amount' field in source database 218. This metadata may include the formula 206 in the first syntax. The target data platform 204 may extract the formula 206 in its first syntax parse the exact symbols that make up formula 206 as defined by the metadata. The target data platform 204 may check each of the dependencies of formula 206 recursively to obtain each of the dependencies. For example, formula 206 may define 'Amount=field A+field B'. Field A may further be a different formula that depends on field C and field D, and so on. Target data platform 204 may recursively parse through formula 206 and each of its dependencies to determine all data 208 which formula 206 depends on, which may include data fields, other formulas, or both, until all dependency branches are exhausted. Target data platform 204 may obtain that data 208 through one or more API calls.

In some embodiments, updating the target database 212 comprises updating a schema 216 that is associated with the target database 212 to include one or more fields or one or more formulas based on the normalized database formula 220. For example, if normalized formula 220 depends on field A and field B in source database 218, which are not already incorporated into target database 212 at the time of the user request, then target data platform 204 may update schema 216 to add those fields to the target database 212 and add a third field corresponding to the normalized formula 220 which will reference those new fields corresponding to field A and field B, in target database 212.

In some embodiments, target data platform 204 may update the target database 212 based on the type of the formula 206. For example, in response to the first database formula 206 being immutable, target data platform 204 may compute or evaluate the normalized database formula 220 based on the updated target database 212. In response to the first database formula 206 being mutable, target data platform 204 may compute the normalized database formula 220 based on a runtime operation that corresponds to the mutable operation in the formula. For example, if the first database formula is 'getCurrentTime( )', then target data platform 204 may perform getCurrentTime( ).

Target data platform 204 may verify that a result of the normalized database normalized formula 220 matches a second result of the first database formula 206. For example, target data platform 204 may evaluate the result of normalized formula 220 which may include one or more imported dependencies (e.g., data 208) that are materialized in updated target database 212. Target data platform 204 may further obtain the evaluated result of formula 206 (based on data 208) from remote data system 202. Target data platform 204 may compare the result of normalized formula 220 (which may call upon other fields in target database 212) with the obtained result of formula 206 to verify that the two are the same (e.g., 'Amount' from remote data system 202 is equal to 'Amount' calculated locally in the target data platform 204). If so, target data platform 204 may present this result to user 222 and deem the operation a success. If there is a discrepancy, then target data platform 204 may take action such as log an error or notify an administrator, or both. Target data platform may log the normalized formula as well as the formula with the first syntax, to track whether the issue may be related to normalization of the formula. Further, target data platform may log each of the dependencies of the normalized formula or the changes that were made to schema 216 as a result of normalized formula 220. Other related information may also be logged.

In some examples, each of a plurality of normalized database formulas has each of one or more dependencies encapsulated into a single fact table. For example, normalized formula 220 along with its dependencies may be encapsulated in a single fact table in schema 216. A second normalized formula (not shown) that is obtained from a different non-normalized formula from a remote data system may be encapsulated in a different fact table in schema 216. Further, translating the first database formula to a normalized database formula having a normalized syntax and evaluation of the first database formula may be performed at runtime (e.g., dynamically, and in response to a user request for a given field). As such, target database 212 may be modified as-needed, pulling the requested information from remote systems (and not other data) without having to synchronize with each and every remote source database.

The target data platform 204 may automatically translate source formulas such as 206 during runtime. Auto-translated formulas (e.g., 220) may be evaluated at runtime (e.g., in response to a user request) rather than materialized in the load tables. This reduces the need for reloading existing tables in order to incorporate a formula field. Target data platform 204 may update schema 216 at runtime (e.g., fact tables may be reloaded if new reference fields are introduced by the normalized formula 220). In some examples, target data platform 204 may implement a manual override to define an improved translation for a formula 206. In response, target data platform 204 may generate a version of normalized formula 220 based on manual input (e.g., a user or administrators input, or a default hard-coded field). It should be understood that aspects described with respect to a remote CRM may, in some embodiments, extend to any remote data source.

Figure 3:
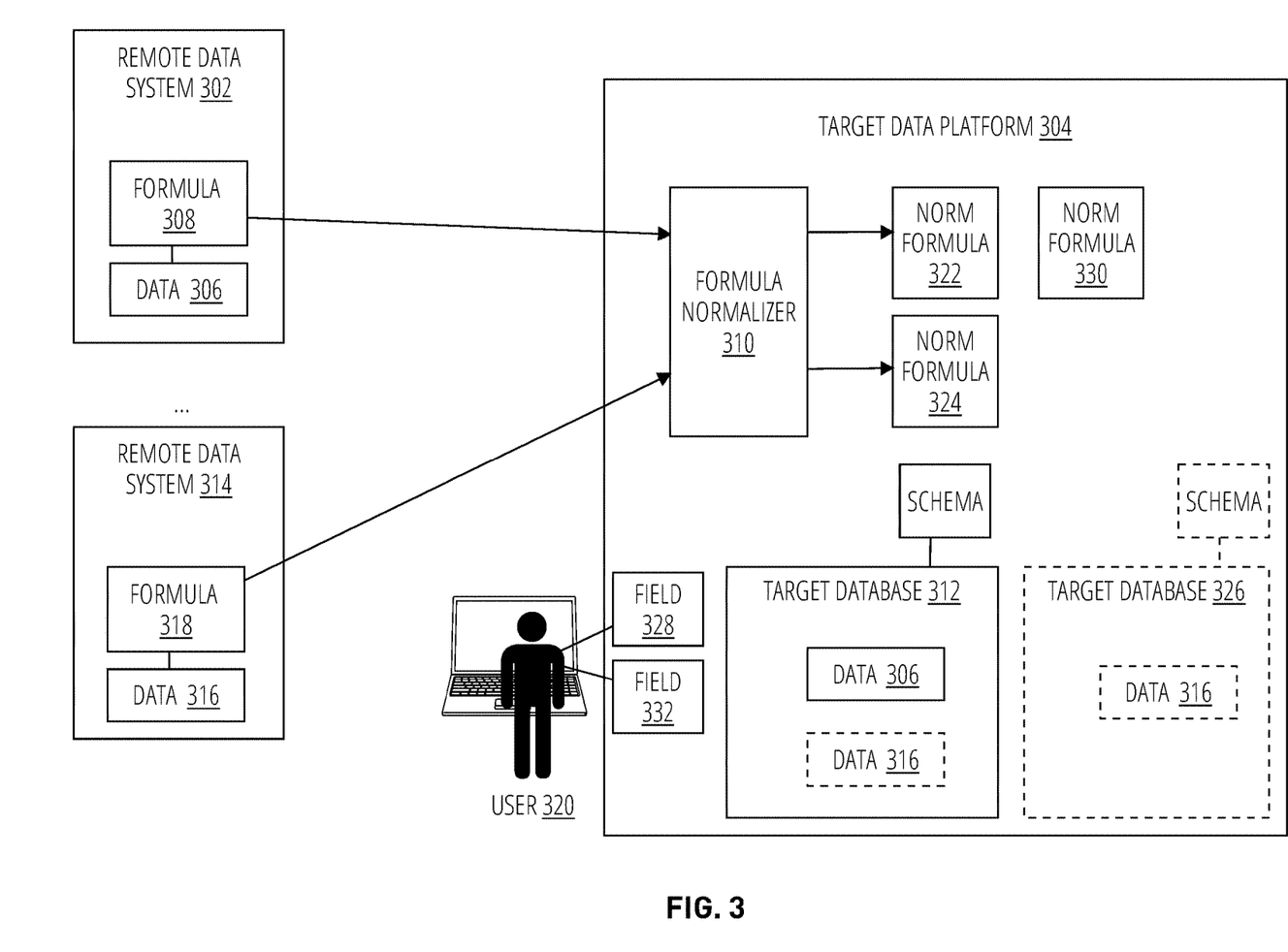
FIG. 3 shows an example of a target data platform with multiple remote data systems, in accordance with one embodiment.

FIG. 3 shows an example of a target data platform 304 with multiple remote data systems, in accordance with one embodiment. Target data platform 304 may correspond to analytics system 110. Similarly, remote data systems 302, 314, may correspond to data sources 108.

Target data platform 304 may be communicatively coupled to a plurality of remote data systems such as remote data system 302 and 314. Each of the remote data systems may include a CRM that internally manages one or more databases.

As described, user 320 may indicate one or more fields 328 of interest that may be present in any one of the remote data systems. In response, target data platform 304 may obtain from remote data system 302 (e.g., a remote customer relationship management (CRM) system), a first database formula 308 having a first syntax. This formula 308 may be associated with data 306 (e.g., in a database) of remote data system 302. Target data platform 304 may include formula normalizer 310 that automatically translates the first database formula 308 to a normalized database formula 322 having a normalized syntax. Target data platform 304 may obtain from the remote data system 302, data 306 that is associated with the first normalized database formula 322, and update target database 312 based on the obtained data 306 and the normalized database formula 322. Remote data systems may also be referred to as remote data sources.

Target data platform 304 may further obtain from a second remote data system 314, a second database formula 318 having a second syntax. Different data systems (e.g., 302, 314) may use a different formula format (e.g., a different symbol or combination of symbols) for expressing the same component. Target data platform 304 may include formula normalizer 310 that translates the second database formula 318 to a second normalized database formula 324. Normalized formula 324 may utilize a common normalized syntax as normalized database formula 322, even if they express different components. For example, assuming that the underlying expression of formula 308 and formula 318 are different, they would be expressed using different symbols, however, if they have the same underlying expression, then they would be expressed with the same combination of symbols under the normalized syntax rules. A symbol may be understood as a character (e.g., a letter, a number, a punctuation, or other a non-alphanumeric character). A component of a formula may include a reference to another field, a relationship, a constant value, an identifier, an algorithm, an operation, or other formula component. Second remote data system 314 may also be referred to as a second remote data source.

Target data platforms 304 may obtain from the second remote data system 314, second data 316 that is associated with the second database formula 318, and update the same target database 312 or a different target database 326, based on the obtained second data 316 and the second normalized database formula 324. For example, in response to user 320 indicating interest in field 328, target data platform 304 may obtain formula 308 and update target database 312 with data 306 to properly evaluate formula 308. Further, user 320 may indicate interest in a second field 332. The target data platform 304 obtain and normalize formula 318 and obtain data 316. Target data platform 304 may put this data 316 and normalized formula 324 in the same target database 312 in accordance with a rubric, a setting, or user input, to provide additional insight based on combined data from remote data system 302 and remote data system 314. In other examples, the target data platform 304 may handle the request of field 332 by entering the data 316 and normalized formula 324 in a separate target database 326, if the target data platform determines there is no relationship between field 328 and field 332.

Further, target data platform 304 may generate a third normalized formula 330. For example, a user may provide input indicating interest in one or more fields in target database 312. This input may indicate a new relationship or combination of relationships between the fields in target database. The target data platform may generate the third normalize formula 330, evaluate it, and display the result to the user 320. In some cases, this third normalized formula 330 may refer to fields in target database 312 from different remote data systems. For example, the third normalized formula 330 may reference data 306 obtained from remote data system 302, and reference data 316 obtained from remote data system 314. As described, with generation of a normalized formula, the target data platform 304 may encapsulate the normalized formula in the schema (e.g., in a dedicated fact table). In such a manner, target data platform 304 may automatically provide evaluation of data from different remote data systems, and provide additional cross-evaluation of data from the different remote systems by expressing new relationships between that data (e.g., using new formulas).

FIG. 4 shows an example of a source formula normalizer, in accordance with one embodiment. The source formula normalizer 404 may take in a formula 402 from a remote data source. The source formula normalizer may detect each of the expressions in the formula 402, and then translate each component (which may also be referred to as a formula element) into a normalized version of that element. The source formula normalizer 404 may output a normalized formula 406 with the normalized version or versions of each formula element, so that the normalized formula 406 retains the same underlying meaning, but is expressed with a normalized syntax. For example, formula 402 may comprise "Account.Name & ':' & Id". Source formula normalizer 404 may parse and detect each component of formula 402, (e.g., Account.Name, :, and 'Id'), and then express each component with the normalized syntax, resulting in '"&": ["$account_name", ":", "$Id"]'.

A different remote data source may provide a different formula 408 having a different syntax but the same underlying components, such as 'CONCAT(Account.Name, ":", Id)'. Source formula normalizer 404 may parse and detect each formula element of the formula 408 and express each formula element with the same normalized syntax, resulting in normalized formula 410. If normalized formula 406 and normalized formula 410 have the same formula elements, then it can be expected for them to be expressed with the same combination and ordering of symbols.

Source formulas 402 and 408 may be captured as part of schema crawls. In some examples, a source formula may not be supported. If a source formula is not supported, the source formula normalizer may log this and continue to extract it as a regular (non-formula) field.

The source formula normalizer 404 may parse the formulas obtained from schema crawls. Source formula normalizer 404 may refer to one or more databases to detect a formula symbol or combination of formula symbols as a formula element (e.g., a field element, or operation) and replace the detected element with a normalized representation of the formula element.

Figure 5:
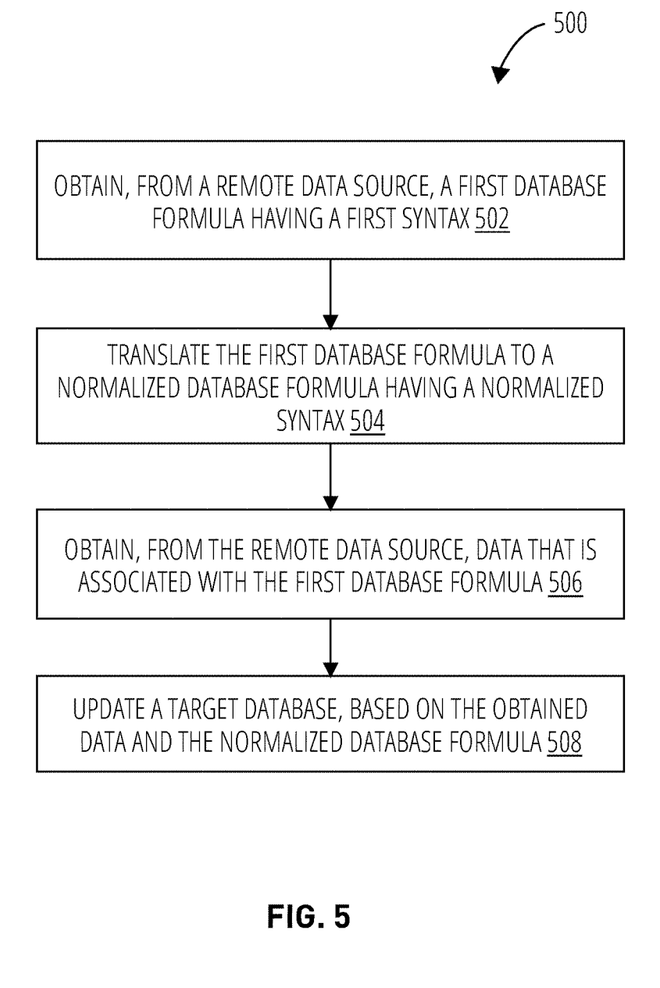
FIG. 5 illustrates an example method for evaluating a formula from a remote data system, in accordance with one embodiment.

FIG. 5 illustrates an example method 500 for evaluating a formula from a remote data system, in accordance with some embodiments. The method may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof.

Method 500 illustrates example functions used by various embodiments. Although specific function blocks ("blocks") are disclosed in the method, such blocks are examples. That is, embodiments are well suited to performing various other blocks or variations of the blocks recited in the method. It is appreciated that the blocks in method 500 may be performed in an order different than presented, and that not all of the blocks in the method may be performed.

At block 502, processing logic obtains, from a remote data source (e.g., a customer relationship management (CRM) system), a first database formula having a first syntax. As described, this may include crawling a schema of the remote data source to obtain the first database formula. The first syntax may be a format for expressing formulas that is native to the remote data source.

At block 504, processing logic translates the first database formula to a normalized database formula having a normalized syntax. The normalized database syntax define rules for symbols such as which combination of symbols to use for a given name or operation. This may include whether to use capital or lower-case letters, how to treat whitespace or non-alphanumeric characters, and which symbols are used to describe operations or relationships between fields.

At block 506, processing logic obtains, from the remote data source, data that is associated with the first database formula. This may include recursively obtaining each and every dependency of the first database formula as the data that is associated with the first database formula.

At block 508, processing logic updates a target database, based on the obtained data and the normalized database formula. For example, processing logic may update the schema (e.g., a star schema) associated with the normalized formula to introduce one or more new fields into the target database, which may be introduced due to the normalized formula. One of the new fields may be a formula field that represents the result or evaluation of the normalized formula may refer to other fields in the target database that may or may not be newly introduced to the target database.

Method 500 may be automatically performed by processing logic (e.g., without human guidance or intervention). For example, if a user input indicates interest in a field in a remote data system, processing logic may automatically crawl the schema of the remote database to obtain the field, and in response to the field being a formula field, processing logic may automatically perform the operations of method 500 as well as other operations described.

Figure 6:
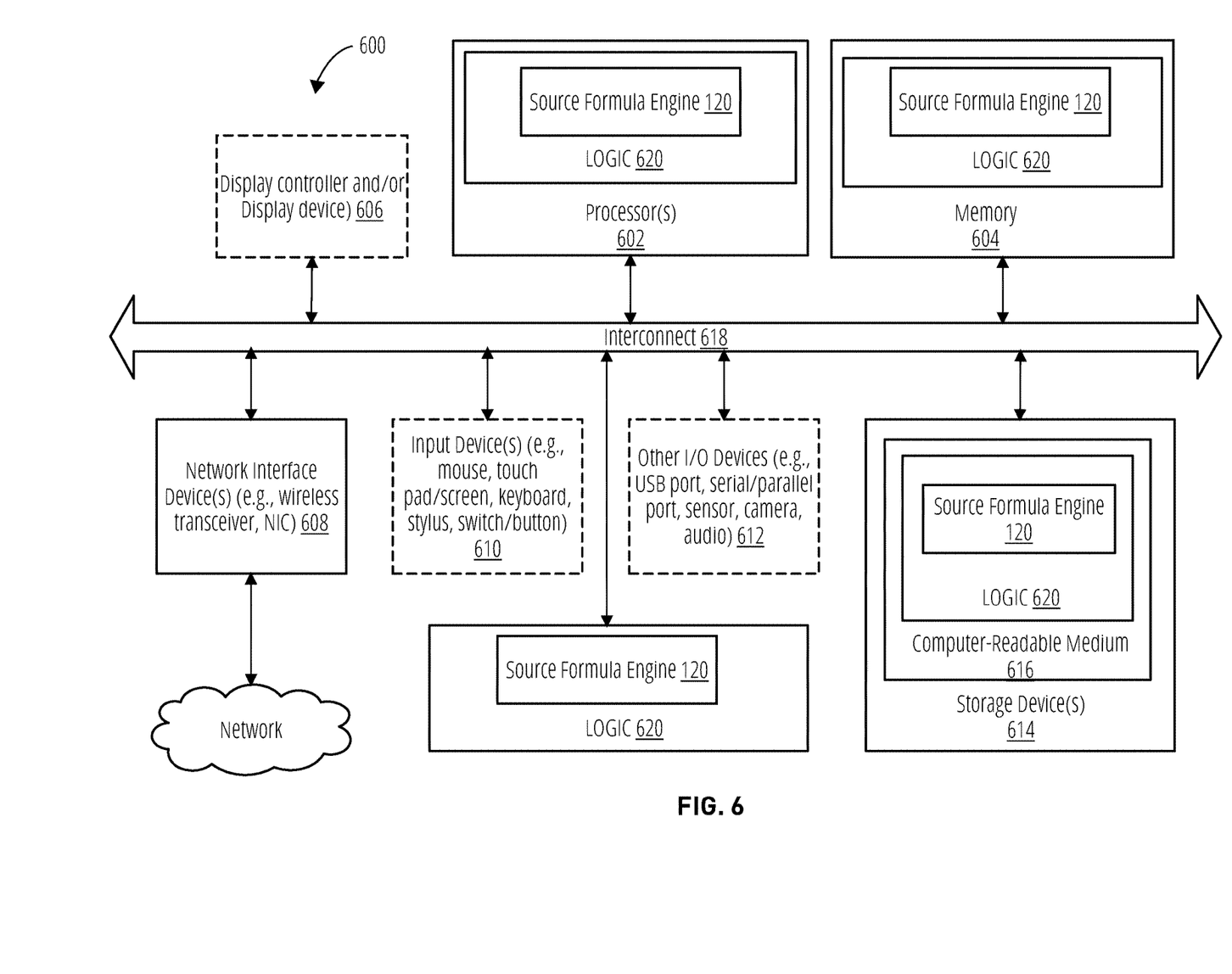
FIG. 6 is a block diagram illustrating an example of a data processing system, in accordance with one embodiment.

FIG. 6 is a block diagram illustrating an example of a data processing system which may be used with one embodiment. For example, system 600 may represent any of the data processing systems described above performing any of the processes or methods described above, such as, for example, client devices 104, 106, data source 108, and analytics system 110 as described in FIG. 1.

System 600 can include various different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 600 is intended to show a high-level view of many components of the computer system. However, it is to be understood that additional components may be present in certain implementations and furthermore, different arrangement of the components shown may occur in other implementations. System 600 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 600 includes processor 602, memory 604, and additional components 608, 610, 612, 614, and 620 which may be coupled over a bus or an interconnect 618. Processor 602 may represent a single processor or multiple processors with a single processor core or multiple processor cores included therein. Processor 602 may represent one or more general-purpose processors such as a microprocessor, a central processing unit (CPU), or the like. More particularly, processor 602 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 602 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 602, which may be a low power multi-core processor socket such as an ultra-low voltage processor, may act as a main processing unit and central hub for communication with the various components of the system. Such processor can be implemented as a system on chip (SoC). Processor 602 is configured to execute instructions for performing the operations and steps discussed herein. System 600 may further include a graphics interface that communicates with optional subsystem 606, which may include a display controller, a graphics processor, and/or a display device.

Processor 602 may communicate with memory 604, which in one embodiment can be implemented via multiple memory devices to provide for a given amount of system memory. Memory 604 may include one or more volatile storage (or memory) devices such as random access memory (RAM), dynamic RAM (DRAM), synchronous DRAM (SDRAM), static RAM (SRAM), or other types of storage devices. Memory 606 may store information including sequences of instructions that are executed by processor 602, or any other device. For example, executable code and/or data of a variety of operating systems, device drivers, firmware (e.g., input output basic system or BIOS), and/or applications can be loaded in memory 606 and executed by processor 602. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 600 may further include IO devices such as, for example, network interface device(s) 608, optional input device(s) 610, and other optional IO device(s) 612. Network interface device 608 may include a wireless transceiver and/or a network interface card (NIC). The wireless transceiver may be a Wi-Fi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 610 may include a mouse, a touch pad, a touch sensitive screen (which may be integrated with display device 606), a pointer device such as a stylus, and/or a keyboard (e.g., physical keyboard or a virtual keyboard displayed as part of a touch sensitive screen). For example, input device 612 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 610 may include an audio device. An audio device may include a speaker and/or a microphone to facilitate voice-enabled functions, such as voice recognition, voice replication, digital recording, and/or telephony functions. Other IO devices 612 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 612 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 618 via a sensor hub (not shown), while other devices such as a keyboard or thermal sensor may be controlled by an embedded controller (not shown), dependent upon the specific configuration or design of system 600.

To provide for persistent storage of information such as data, applications, one or more operating systems and so forth, a mass storage (not shown) may also couple to processor 602. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor(s) 602, e.g., via a serial peripheral interface (SPI). This flash device may provide for non-volatile storage of system software, including a basic input/output software (BIOS) as well as other firmware of the system.

Storage device 614 may include computer-accessible storage medium 616 (also known as a machine-readable storage medium or a computer-readable medium) on which is stored one or more sets of instructions or software (e.g., module, unit, and/or logic 620) embodying any one or more of the methodologies or functions described herein. Module/unit/logic 620 may also reside, completely or at least partially, within memory 604 and/or within processor 602 during execution thereof by data processing system 600, memory 604 and processor 602 also constituting machine-accessible storage media. Module/unit/logic 620 may further be transmitted or received over a network via network interface device 608.

Computer-readable storage medium 616 may also be used to store some software functionalities described above persistently. While computer-readable storage medium 616 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 620, components and other features described herein can be implemented as discrete hardware components or integrated in the functionality of hardware components such as ASICS, FPGAs, DSPs or similar devices. In addition, module/unit/logic 620 can be implemented as firmware or functional circuitry within hardware devices. Further, module/unit/logic 620 can be implemented in any combination hardware devices and software components.

Logic 620 may include source formula engine 120. Source formula engine 120 may perform the operations described, such as the method of 500 or any of the operations performed by analytics system 110.

Note that while system 600 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

In some aspects, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some aspects, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

What is claimed is:

1. A method, performed by a computing device, comprising:
    obtaining, from a remote data source, a first database formula having a first syntax;
    translating the first database formula to a normalized database formula having a normalized syntax;
    obtaining, from the remote data source, data that is associated with the first database formula;
    updating a target database, based on the obtained data from the remote data source and the normalized database formula;
    obtaining, from a second remote data source, a second database formula having a second syntax that is different from the first syntax;
    translating the second database formula to a second normalized database formula having said normalized syntax;
    obtaining, from the second remote data source, second data that is associated with the second database formula; and
    updating the target database or a second target database, based on the obtained second data and the second normalized database formula.

2. The method of claim 1, further comprising displaying a result of the normalized database formula to a user, wherein the first database formula is selected in response to a user input from the user, indicating one or more fields of interest that are associated with the first database formula of the remote data source.

3. The method of claim 1, further comprising generating a normalized third formula that refers to the obtained data from the remote data source, and the obtained data from the second remote data source that are in the target database, and displaying a result of the normalized third formula to a user.

4. The method of claim 1, wherein obtaining the data from the remote data source comprises: using an application programming interface (API) to retrieve metadata associated with a database field of the remote data source, extracting the first database formula from the metadata, and in response to the first database formula having one or more dependencies, recursively obtaining one or more additional database fields or one or more additional database formulas that the first database formula depends on.

5. The method of claim 1, wherein updating the target database comprises updating a schema that is associated with the target database to include one or more fields or one or more formulas based on the normalized database formula.

6. The method of claim 1, wherein updating the target database comprises: in response to the first database formula being immutable, computing the normalized database formula based on the updated target database, and in response to the first database formula being mutable, computing the normalized database formula based on a runtime operation.

7. The method of claim 1, further comprising: verifying that a result of the normalized database formula matches a second result of the first database formula.

8. The method of claim 1, wherein each of a plurality of normalized database formulas has each of one or more dependencies encapsulated into a single fact table.

9. The method of claim 1, wherein translating the first database formula to the normalized database formula having the normalized syntax and evaluation of the first database formula is performed at runtime.

10. A computing apparatus comprising:
    a processor; and
    a non-transitory computer-readable memory storing instructions that, when executed by the processor, configure the apparatus to:
    obtain, from a remote data source, a first database formula having a first syntax, including: to use an application programming interface (API) to retrieve metadata associated with a database field of the remote data source, extract the first database formula from the metadata, and in response to the first database formula having one or more dependencies, recursively obtaining one or more additional database fields or one or more additional database formulas that the first database formula depends on;

translate the first database formula to a normalized database formula having a normalized syntax;

obtain, from the remote data source, data that is associated with the first database formula; and update a target database, based on the obtained data and the normalized database formula.

11. The computing apparatus of claim 10, wherein the instructions further configure the apparatus to display a result of the normalized database formula to a user, wherein the first database formula is selected in response to a user input from the user, indicating one or more fields of interest that are associated with the first database formula of the remote data source.

12. The computing apparatus of claim 10, wherein the instructions further configure the apparatus to:

obtain, from a second remote data source, a second database formula having a second syntax that is different from the first syntax;

translate the second database formula to a second normalized database formula having said normalized syntax;

obtain, from the second remote data source, second data that is associated with the second database formula; and update said target database or a second target database, based on the obtained second data and the second normalized database formula.

13. The computing apparatus of claim 12, wherein the instructions further configure the apparatus to generate a normalized third formula that refers to the obtained data from the remote data source, and the obtained data from the second remote data source that are in the target database, and displaying a result of the normalized third formula to a user.

14. A non-transitory computer-readable storage medium, the computer-readable storage medium including instructions that when executed by a processing device, cause the processing device to:

obtain, from a remote data source, a first database formula having a first syntax;

translate the first database formula to a normalized database formula having a normalized syntax;

obtain, from the remote data source, data that is associated with the first database formula; and update a target database, based on the obtained data and the normalized database formula, wherein to update the target database comprises: in response to the first database formula being immutable, computing the normalized database formula based on the updated target database, and in response to the first database formula being mutable, computing the normalized database formula based on a runtime operation.

15. The non-transitory computer-readable storage medium of claim 14, wherein the instructions further configure the processing device to display a result of the normalized database formula to a user, wherein the first database formula is selected in response to a user input from the user, indicating one or more fields of interest that are associated with the first database formula of the remote data source.

16. The non-transitory computer-readable storage medium of claim 14, wherein the instructions further configure the processing device to:

obtain, from a second remote data source, a second database formula having a second syntax that is different from the first syntax;

translate the second database formula to a second normalized database formula having said normalized syntax;

obtain, from the second remote data source, second data that is associated with the second database formula; and update said target database or a second target database, based on the obtained second data and the second normalized database formula.

17. The non-transitory computer-readable storage medium of claim 16, wherein the instructions further configure the processing device to generate a normalized third formula that refers to the obtained data from the remote data source, and the obtained data from the second remote data source that are in the target database, and displaying a result of the normalized third formula to a user.

18. The non-transitory computer-readable storage medium of claim 14, wherein obtaining the data from the remote data source comprises using an application programming interface (API) to retrieve metadata associated with a database field of the remote data source, extract the first database formula from the metadata, and in response to the first database formula having one or more dependencies, recursively obtaining one or more additional database fields or one or more additional database formulas that the first database formula depends on.

* * * * *